(12) United States Patent
Li et al.

(10) Patent No.: US 7,744,037 B2
(45) Date of Patent: Jun. 29, 2010

(54) CALCULATING METHOD FOR DEDUCING POSSIBILITIES OF ALL POSSIBLE SCENARIOS OF SATELLITE MEMBERS IN LOW EARTH SATELLITE CONSTELLATION

(75) Inventors: Sheng-Yi Li, Dasi Township (TW); Chao-Han Liu, Taipei (TW)

(73) Assignee: National Defense University, Taoyuan County (TW)

( * ) Notice: Subject to any disclaimer, the term of this patent is extended or adjusted under 35 U.S.C. 154(b) by 583 days.

(21) Appl. No.: 11/733,866

(22) Filed: Apr. 11, 2007

(65) Prior Publication Data

US 2008/0251645 A1 Oct. 16, 2008

(51) Int. Cl.
*B64G 1/00* (2006.01)
(52) U.S. Cl. .................. 244/158.6; 244/158.4; 701/226; 455/13.2
(58) Field of Classification Search ............... 244/158.6, 244/158.4, 158.5; 455/13.2, 12.1, 13.1, 427; 342/357.06; 701/226, 13
See application file for complete search history.

(56) References Cited

U.S. PATENT DOCUMENTS

| | | | | |
|---|---|---|---|---|
| 5,267,167 | A | * | 11/1993 | Glickman .................. 701/226 |
| 6,122,596 | A | * | 9/2000 | Castiel ........................ 701/226 |
| 6,336,612 | B1 | * | 1/2002 | Taormina et al. .......... 244/158.4 |
| 6,453,220 | B1 | * | 9/2002 | Barker ............................ 701/3 |
| 6,491,257 | B1 | * | 12/2002 | Emmons et al. ........... 244/158.6 |
| 6,553,286 | B2 | * | 4/2003 | Turner et al. ................... 701/13 |
| 6,708,116 | B2 | * | 3/2004 | Wright ........................ 701/226 |
| 6,950,060 | B1 | * | 9/2005 | Klein ........................... 342/358 |
| 7,198,230 | B2 | * | 4/2007 | Yung et al. ................ 244/158.4 |
| 7,258,305 | B1 | * | 8/2007 | Murphy ..................... 244/158.4 |
| 7,270,299 | B1 | * | 9/2007 | Murphy ..................... 244/158.4 |
| 7,370,566 | B2 | * | 5/2008 | Furman ....................... 89/1.11 |
| 2001/0013566 | A1 | * | 8/2001 | Yung et al. ............... 244/158 R |
| 2004/0065781 | A1 | * | 4/2004 | Bingaman et al. ........... 244/172 |
| 2006/0060717 | A1 | * | 3/2006 | Castiel et al. ............. 244/158.4 |

\* cited by examiner

*Primary Examiner*—Christopher P Ellis

(57) ABSTRACT

A calculating method for deducing all possible scenarios of satellite members and possibilities thereof in a low earth orbiting (LEO) satellite constellation is described, which is achieved mainly by relying on the spherical geometry analysis and probabilities and statistics technologies, in an attempt to rapidly and precisely obtain the concerned scenarios and possibilities thereof observed on the earth ground. With any user-defined orbital parameters and a position of an observation station for the scenarios on the earth ground inputted, all the possible scenarios and possibilities thereof can be obtained with the calculating method.

4 Claims, 6 Drawing Sheets

US 7,744,037 B2

CALCULATING METHOD FOR DEDUCING POSSIBILITIES OF ALL POSSIBLE SCENARIOS OF SATELLITE MEMBERS IN LOW EARTH SATELLITE CONSTELLATION

BACKGROUND OF THE INVENTION

1. Field of Invention

The present invention relates to a calculating method for deducing possibilities of all possible scenarios of satellite members in a low earth orbiting (LEO) satellite constellation, and particularly to a calculating method for deducing possibilities of all possible scenarios of satellite members in a LEO satellite constellation by relying on the spherical geometrical analysis and probabilities and statistics technologies, which is capable of obtaining all the possible scenarios and probabilities thereof in a rapid and precise manner.

2. Related Art

Within a satellite constellation, quality of signal reception on earth ground from the other satellite members is related to probabilities of possible scenarios of the oilier satellite members in the same satellite constellation, in which the probabilities of the possible scenarios are related not only to parameters associated with the satellite members but also to the latitude of a position of an observation station for the signal reception on the earth ground. In the past, there was not any method having capability of rapidly and precisely deducing possibilities of all the possible scenarios for any constellation observed at any location. Instead, there only exist methods for obtaining probabilities of all the possible scenarios for a given satellite constellation observed at a given location by an orbital simulating method requiring collection of a great deal of data and then by statistically analyzing the collected data. The thus calculated probabilities each have an error dependent on the amount of the collected data.

SUMMARY OF THE INVENTION

In accordance with the present invention, a calculating method for deducing probabilities of all possible scenarios of satellite members in a low earth orbiting (LEO) satellite constellation is provided, which is achieved mainly by relying on the spherical geometry analysis and probabilities and statistics technologies, and through which an expression of a mathematical function is derived and the to-be-solved probabilities can be obtained by merely placing parameters associated into the expression without the need of the orbital simulating process and thus analysis of a great deal of data.

With execution of the present invention, a calculation time and a memory space required for the deduction are reduced. Further, the thus calculated probabilities of all the possible scenarios are more precise, compared with that deduced by the prior art.

DETAILED DESCRIPTION OF THE INVENTION

The present invention discloses a calculating method for deducing all possible scenarios of satellite members and possibilities thereof in a low earth orbiting (LEO) satellite constellation, which executes the steps described below.

First, parameters of a to-be-simulated satellite constellation are set as Table 1 follows. In addition to the three available satellite constellations in Table 1, other satellite constellations may be possible for simulation and demonstration in the design stage.

TABLE 1

Ideal parameters of three specific satellite constellation

| Satellite Constellation | GPS | Iridium | Globalstar |
|---|---|---|---|
| Orbital Plane | 6 | 6 | 8 |
| Number of Satellites on Each Orbital Plane | 4 | 11 | 6 |
| Separation between Orbital Planes | 60° | 31.6° | 45° |
| Altitude of Orbital Plane | 20200 km | 780 km | 1414 km |
| Inclined Angle of Orbit | 55° | 86.4° | 52° |
| Phase Offset of Satellites on Adjacent Orbital Planes | 90° | 16.36° | 7.5° |
| Minimum Angle of Elevation | 10° | 8.2° | 10° |

Figure 1:
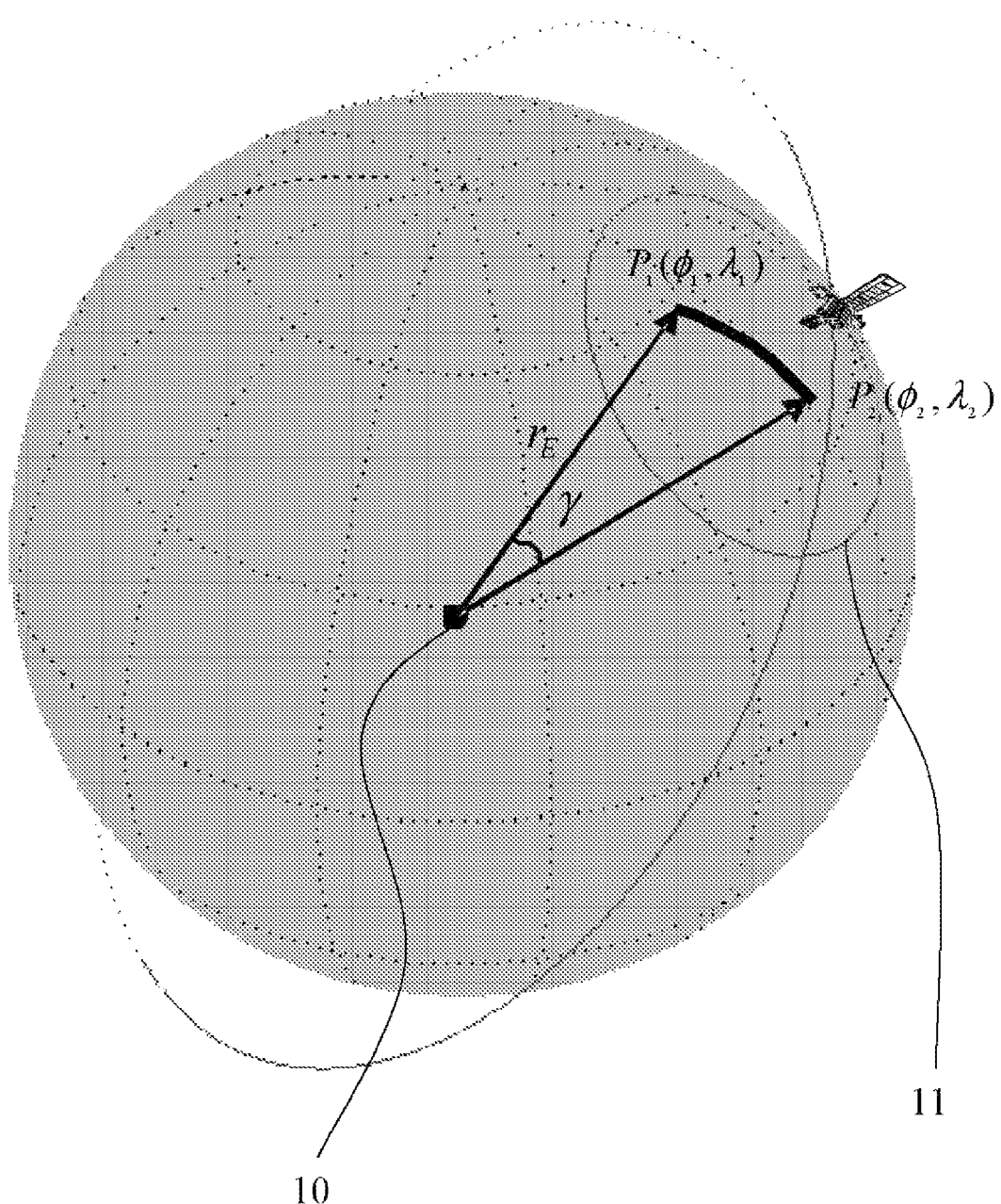
FIG. 1 is a schematic diagram for illustration of the fundamental spherical geometry principle.

Then, the spherical geometry principle is applied. In this stage, some fundamental spherical geometry formulas are discussed for application to subsequent stages in deduction of all possible scenarios and probabilities thereof. Since the earth is assumed as an ideal spherical body in the deduction, the spherical: geometry principle is required to describe the geometrical relationship between the earth and the satellites, which is illustrated in FIG. 1, where a center of the earth 10 and a covered region 11 are shown. For benefiting the analysis, the following fundamental spherical geometry principles are required.

A distance between two points of the surface of the earth is represented by an angle formed with an imaginary line extending from one of the points to the center of the earth and another imaginary line extending from the other points to the center of the earth. Assume the two points are P1 and P2, respectively, with their respective coordinates of $(\phi_1, \lambda_1)$ and $(\phi_2, \lambda_2)$, wherein $\phi$ denotes the latitude and $\lambda$ denotes the longitude. At this time, the angle representing the distance between the two points P1 and P2 is:

$$\gamma = \cos^{-1}[\sin\phi_1 \sin\phi_2 + \cos\phi_1 \cos\phi_2 \cos(\lambda_1 - \lambda_2)], \quad (1)$$

It is to be noted that a distance between two points on the earth ground is presented in angle (or radian) in the spherical geometry relationship. To be represented in MKS, the distance may be expressed as:

$$d(P_1, P_2) = r_E \cdot \gamma, \quad (2)$$

wherein a radius of the earth $r_E$=6378.145 km. As an example, a distance of 3.5° (approximately 0.0610865 rad) is equivalent to a distance of 6378.145×0.0610865=389.62 km.

Figure 2:
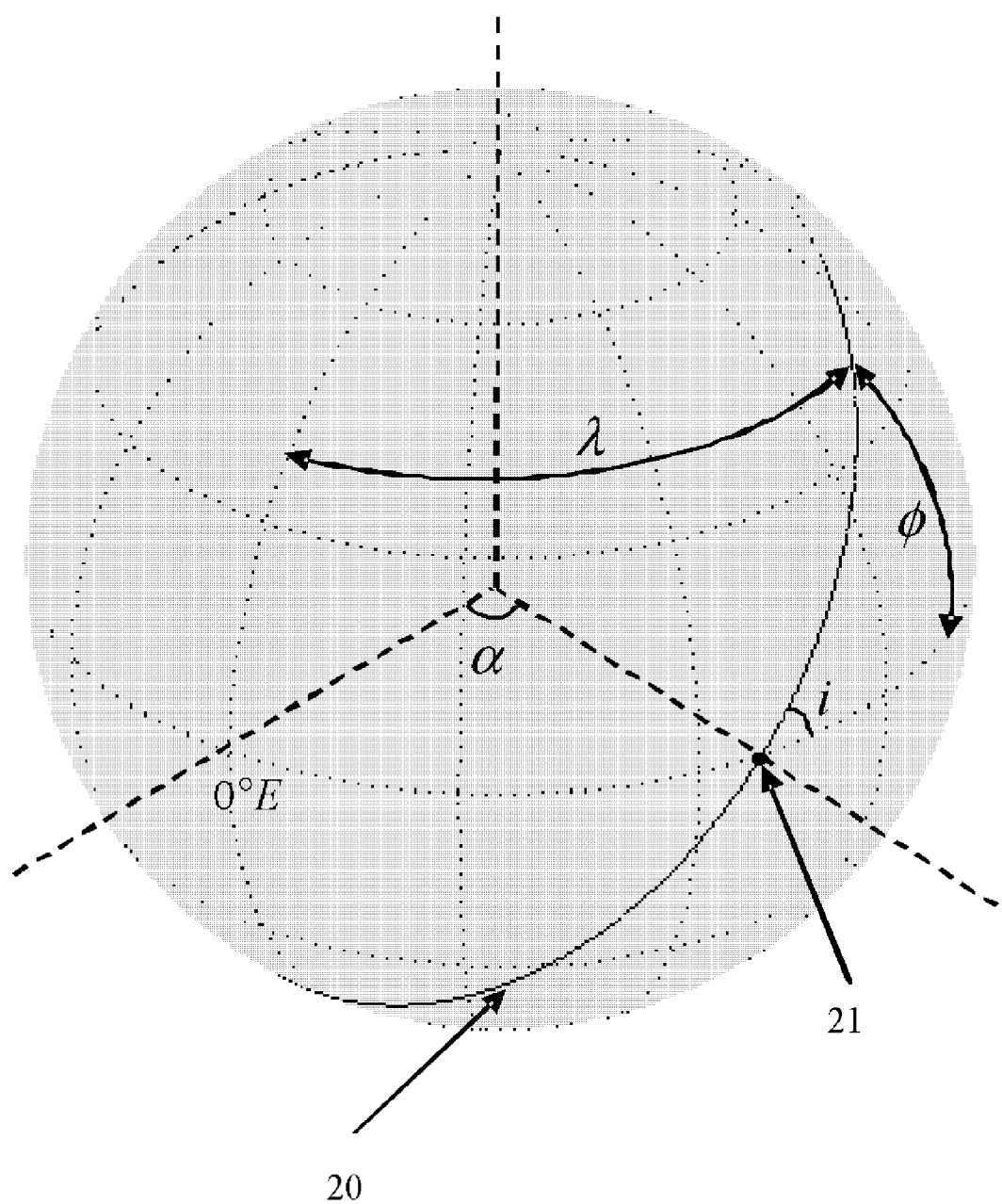
FIG. 2 is a schematic diagram for illustration of the ECF.

Viewed in the earth center fixed (ECF) coordinate system, the orbits of the satellites has a trajectory 20 in the form of a great circle on the earth ground, shown in FIG. 2, which can be represented with the following equation:

$$\tan \phi = \tan i \cdot \sin(\lambda - \alpha), \quad (3)$$

wherein $\phi$, $\lambda$ and $\alpha$ are latitude, longitude and longitude of an ascending node 21 of the orbit, respectively, and i is an inclined angle of the orbit. Through Eq. (3), the latitude $\phi$, longitude $\lambda$ and the position $\alpha$ of the ascending node 21 can be known. In FIG. 2, substellar points 22 of the satellites are also shown.

Figure 3:
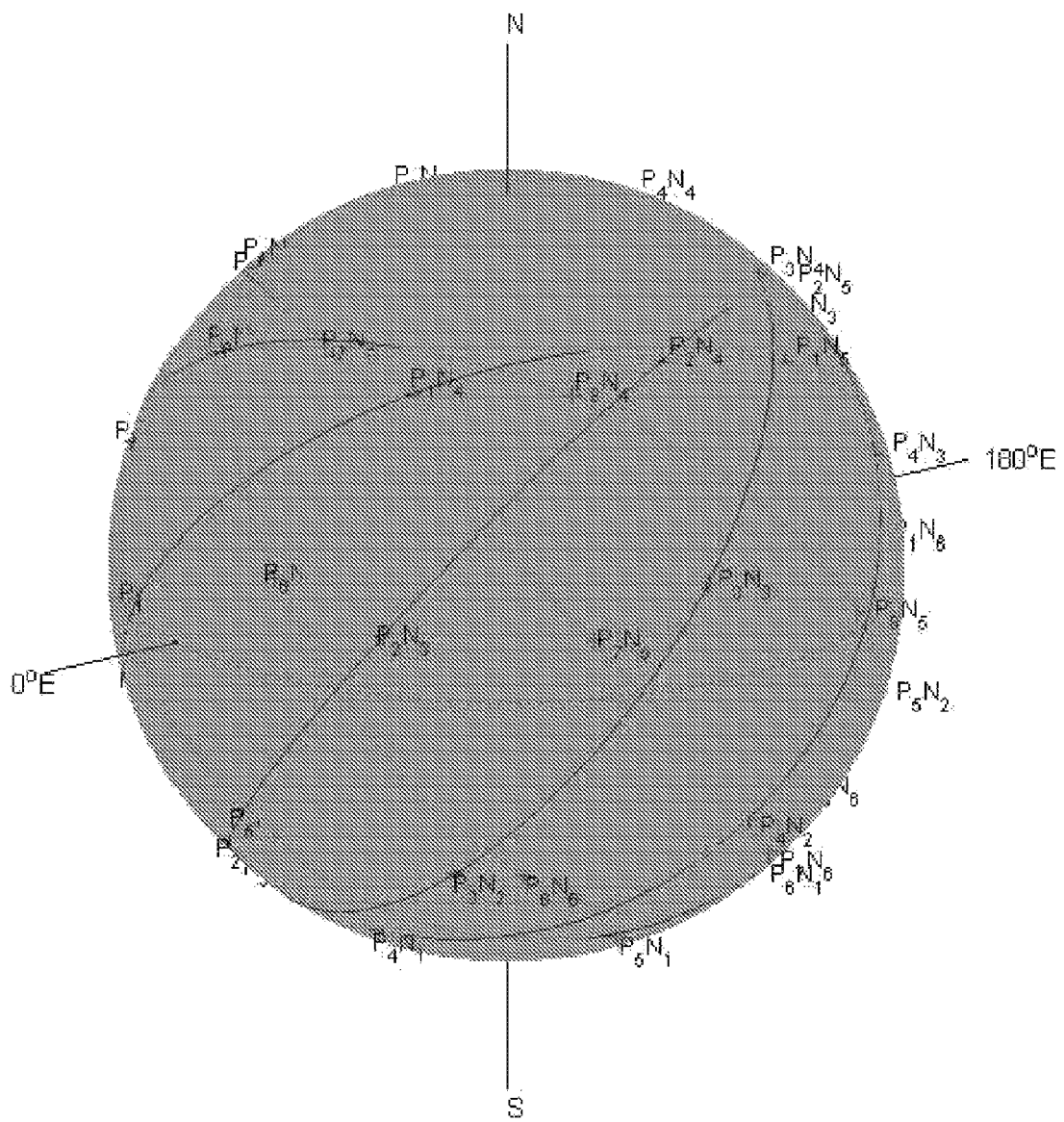
FIG. 3 is a diagram of a satellite constellation including P orbital planes each having N satellites, in which P=8 and N=6.

Next, positions of the substellar points of all of the satellites are to be determined. In this stage, it is to demonstrate that when the position of a member of the satellites is known, the positions of the other satellite members can be deduced by using the spherical geometry principle and referring to the parameters of the satellite constellations listed in Table 1. FIG. 3 shows a satellite constellation including P orbits each having an orbital plane on which N satellites orb. $P_iN_j$ denotes the position of a substellar point of a j-th satellite orbiting on an i-th orbital plane. Since all the substellar points vary with time, only an instant scenario is illustrated in this figure. Now assume $S^{(p,n)}$ and $\omega^{(p,n)}$, p=1 . . . P, n=1, . . . N, are the substellar point and a phase of the n-th satellite orbiting on the p-th orbital plane, respectively. $\alpha_p$, p=1 . . . P, is a longitudinal position of an ascending node of the p-th orbital plane. With the substellar point known, the other satellite members in the satellite constellation can be deduced based on the spherical geometry principle by performing the following steps. It is to be noted that any substellar point is on the earth ground and can be represented as the latitude and longitude as long as the latitude thereof has to be lower than the inclined angle i of the orbit since there is no substellar point having a latitude higher than i.

For a satellite $S^{(u,v)}$ having the latitude $\phi^{(u,v)}$, and the longitude $\lambda^{(u,v)}$, the orbital plane u can be assumed as a great circle. At this time, the longitude $\alpha_u$ of the ascending node of the circle can be deduced according to Eq. (3) and the phase $\omega^{(u,v)}$ of the satellite $S^{(u,v)}$ can be obtained according to the geometrical relationship illustrated in FIG. 2. If the satellite $S^{(u,v)}$ moves in an ascending direction, i.e. it moves from south to north ($\alpha_u - \pi/2 \leq \lambda^{(u,v)} < \alpha_u + \pi/2$ and $-\pi/2 \leq \omega^{(u,v)} < \pi/2$), the longitude $\alpha_u$ of the ascending node can be deduced through the following equation:

$$\alpha_u = \lambda^{(u,v)} - \sin^{-1}\left(\frac{\tan\phi^{(u,v)}}{\tan i}\right), \quad (4)$$

and the phase $\omega^{(u,v)}$ of the satellite can be obtained through the spherical geometry relationship illustrate in FIG. 2 as:

$$\omega^{(u,v)} = \sin^{-1}\left(\frac{\sin\phi^{(u,v)}}{\sin i}\right). \quad (5)$$

Similarly, if the satellite $S^{(u,v)}$ moves in a descending direction, i.e. it moves from north to south ($\alpha_u + \pi/2 \leq \lambda^{(u,v)} \leq \alpha_u + 3\pi/2$ and $\pi/2 \leq \omega^{(u,v)} \leq 3\pi/2$), Eqs. (4) and (5) are respectively replaced with the following equations:

$$\alpha_u = \lambda^{(u,v)} + \sin^{-1}\left(\frac{\tan\phi^{(u,v)}}{\tan i}\right) - \pi, \quad (6)$$

-continued $$\omega^{(u,v)} = \pi - \sin^{-1}\left(\frac{\sin\phi^{(u,v)}}{\sin i}\right). \quad (7)$$

Based on the deduced longitude $\alpha_u$ of the ascending node of the orbital plane u and the phase $\omega^{(u,v)}$ of the satellite $S^{(u,v)}$, the ascending nodes and phases for the other orbital planes can be obtained by using the following equations:

$$\alpha_p = \alpha_u + (p-u)\cdot\Delta\alpha, \, p=1 \ldots P, \quad (8)$$

$$\omega^{(p,n)} = \omega^{(u,v)} + (p-u)\cdot\Delta\omega + (n-v)\cdot\Delta\psi, \, p=1 \ldots P, \, n=1 \ldots N \quad (9)$$

wherein $\Delta\alpha = |\alpha_p - \alpha_{p\pm1}|$ is a separation of the ascending nodes of adjacent orbital planes, $\Delta\omega = |\omega^{(p,n)} - \omega^{(p\pm1,n)}|$ is a phase difference of the satellites having the same numeral label orbing on adjacent orbital planes, and $\Delta\psi = |\omega^{(p,n)} - \omega^{(p,n\pm1)}|$ is a phase difference between adjacent satellites according to their numerical label orbing on the same orbital planes.

Based on the longitudes $\alpha_p$ of the ascending nodes of all the orbital planes and the phases $w^{(p,n)}$ of all the satellites, the substellar points and phases of all the satellites $\phi^{(p,n)}$ and $\lambda^{(p,n)}$, p=1 . . . P, n=1 . . . N, can be deduced as follows.

$$\phi^{(p,n)} = \sin^{-1}(\sin \omega^{(p,n)} \sin i), \quad (10)$$

$$\lambda^{(p,n)} = \begin{cases} \alpha_P + \tan^{-1}(\cos i / \cot\omega^{(p,n)}), & \phi^{(p,n)} \geq 0 \\ \alpha_P + \tan^{-1}(\cos i / \cot\omega^{(p,n)}) + \pi, & \phi^{(p,n)} < 0 \end{cases}. \quad (11)$$

To further explain the principle the calculation at this stage is based on, a satellite constellation Globalstar is taken as an example. This satellite constellation has P=8 orbital planes on each of which N=6 satellites orb, and thus forty-eight satellites. Each satellite in the satellite constellation has an inclined angle i=52°. The orbit has an altitude of h=1414 km. Assume the 5-th satellite on the 8 orbital plane is taken as a reference satellite, whose constellar point $S^{(8,5)}$ is known to have the longitude $\phi^{(8,5)}=2.84°$ and the latitude $\lambda^{(8,5)}=118.32°$, and the reference satellite moves in the ascending direction.

In Table 2 to Table 4, the longitudes of the ascending nodes of the individual orbital planes and the longitudes and latitudes of the substellar points of the individual satellites deduced from the afore-mentioned steps are shown, respectively. It is demonstrated that the values in Table 2 to Table 4 all tally with those obtained by the commercially available simulation software STK.

TABLE 2

| | The longitudes $\alpha_p$ of the ascending nodes of the individual orbital planes | | | |
|---|---|---|---|---|
| Orbital Plane | 1 | 2 | 3 | 4 |
| $\alpha_p$ | 345.5412 | 30.5412 | 75.5412 | 120.5412 |
| Orbital Plane | 5 | 6 | 7 | 8 |
| $\alpha_p$ | 165.5412 | 210.5412 | 255.5412 | 300.5412 |

TABLE 3

The latitudes $\phi^{(p, n)}$ of the substellar points of
the satellite members in the satellite constellation

| | n | | | | | |
|---|---|---|---|---|---|---|
| p | 1 | 2 | 3 | 4 | 5 | 6 |
| 1 | −45.04 | −40.85 | 3.06 | 45.04 | 40.85 | −3.06 |
| 2 | −48.31 | −36.2 | 8.95 | 48.31 | 36.23 | −8.95 |
| 3 | −50.64 | −31.20 | 14.78 | 50.64 | 31.20 | −14.78 |
| 4 | −51.85 | −25.85 | 20.50 | 51.85 | 25.85 | −20.50 |
| 5 | −51.83 | −20.28 | 26.06 | 51.83 | 20.28 | −26.0 |
| 6 | −50.57 | −14.56 | 31.40 | 50.57 | 14.56 | −31.40 |
| 7 | −48.20 | −8.72 | 36.42 | 48.20 | 8.72 | −36.42 |
| 8 | −44.89 | −2.84 | 41.01 | 44.89 | 2.84 | −41.01 |

TABLE 4

The longitudes $\lambda^{(p, n)}$ of the substellar points of
the satellite members in the satellite constellation

| | n | | | | | |
|---|---|---|---|---|---|---|
| p | 1 | 2 | 3 | 4 | 5 | 6 |
| 1 | 217.02 | 303.04 | 347.94 | 37.02 | 123.04 | 167.94 |
| 2 | 271.87 | 355.60 | 37.61 | 91.87 | 175.60 | 217.61 |
| 3 | 327.85 | 47.29 | 87.44 | 147.85 | 227.29 | 267.44 |
| 4 | 24.69 | 98.29 | 137.53 | 204.69 | 278.29 | 317.53 |
| 5 | 81.85 | 148.75 | 188.01 | 261.85 | 328.7 | 8.01 |
| 6 | 138.66 | 198.83 | 239.02 | 318.66 | 18.83 | 59.02 |
| 7 | 194.61 | 248.65 | 290.74 | 14.61 | 68.65 | 110.74 |
| 8 | 249.41 | 298.32 | 343.35 | 69.41 | 118.32 | 163.35 |

Figure 4:
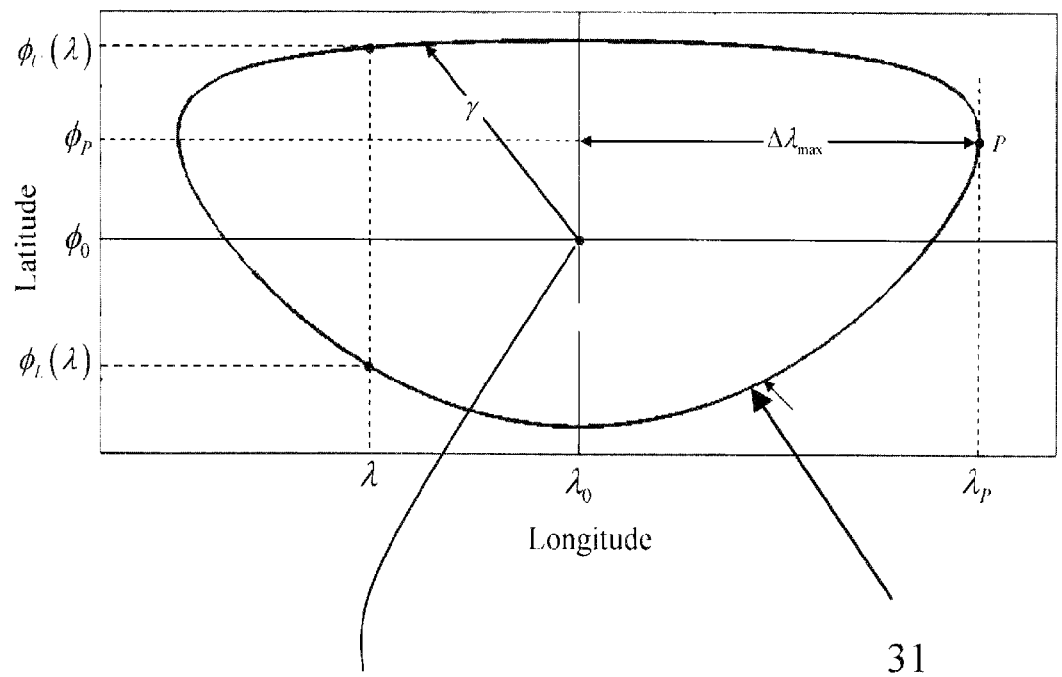
FIG. 4 is a diagram illustrating a covered range with respect to an angle of elevation centered at an observer.
Figure 5:
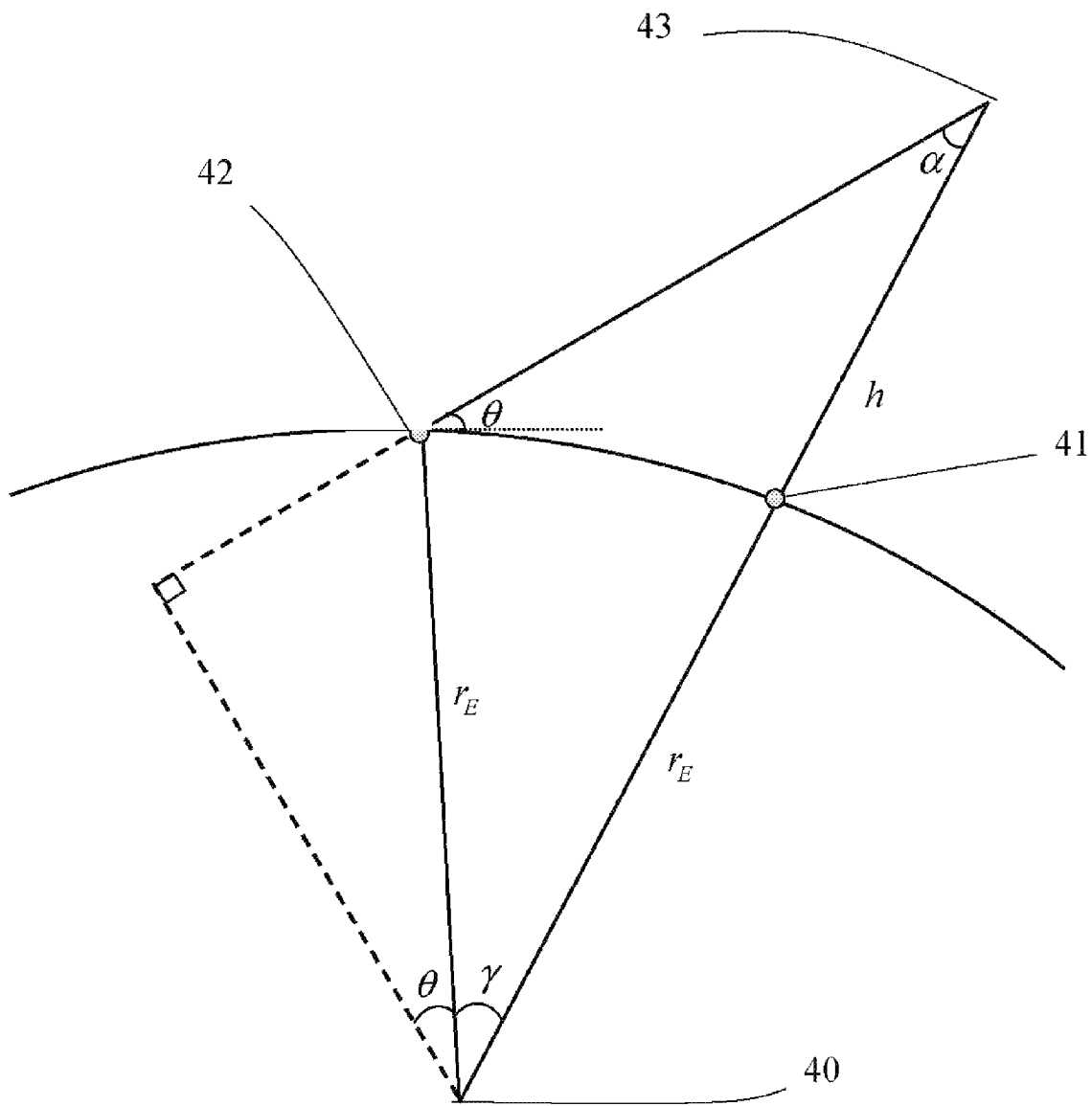
FIG. 5 is a schematic diagram for illustration how the angle of elevation is calculated.

Then, a probability of the known satellite $S^{(u,v)}$ whose substellar point is located at a specific observation position of an observation station on the earth ground is calculated. In the last step, the position of the reference satellite $S^{(p,n)}$ is first assumed as known, such as $\phi^{(8,5)}=2.84°$ and $\lambda^{(8,5)}=118.32°$, and then the positions of the other satellites are deduced. As such, the scenario for any position where an observer is located is determined. Based on this, the probability of the scenario, i.e., the probability of the reference satellite falling within the assumed position (i.e. $\phi^{(8,5)}=284°$ and $\lambda^{(8,5)}=118.32°$), can be deduced. FIG. 4 shows a covered range 31 of and centered at the observer or the observer station on the earth ground with an angle of elevation, in which the longitude $\lambda$ is taken at x-axis while the latitude $\phi$ at y-axis in the shown coordinate system. FIG. 5 is a schematic diagram for illustration how the angle of elevation is calculated. In FIG. 5, the satellite 43, substellar points 41, observer 42 and the earth center 40 are shown. The shown covered range with respect to the angle of elevation is dependent on a minimum angle of elevation $\theta=\theta_{min}$ and is a small circle with the radius of $\gamma$. It can be known the radius $\gamma$ based on a planar triangularity shown in FIG. 5 has the following form:

$$\gamma = \cos^{-1}\left(\frac{r_E}{r_E+h} \cdot \cos\theta_{min}\right) - \theta_{min}, \quad (12)$$

Further, the longitude $\lambda$ of the reference satellite can be known as:

$$\lambda = \lambda_0 \pm \cos^{-1}\left(\frac{\cos\gamma - \sin\phi\sin\phi_0}{\cos\phi\cos\phi_0}\right), \quad \phi_0 - \gamma \le \phi \le \phi_0 + \gamma, \quad (13)$$

wherein $\phi_0$ and $\lambda_0$ are the respective latitudes and longitudes of the observer or the on-the-ground observation station. To determine the dimension of the covered range with respect to the angle of elevation, it is aimed to deduce a boundary of the covered range with respect to the angle of elevation on the earth ground, expressed in longitude and latitude. In FIG. 4, P is set as the substellar point whose longitude has a maximum phase difference $\Delta\lambda_{max}$ with respect to the observer and the position of the substellar point P is expressed as $(\phi_P, \lambda_P)$. By differentiating $\lambda$ with respect to $\phi$, i.e.

$$\frac{d\lambda}{d\phi}\bigg|_{\phi=\phi_P} = 0, \quad (14)$$

it can be obtained that $$\phi_P = \tan^{-1}\left(\frac{\sin\phi_0}{\sqrt{\cos^2\gamma - \sin^2\phi_0}}\right). \quad (15)$$

By replacing $\phi$ with $\phi_P$ in Eq. (13), $\lambda=\lambda_P$ can be obtained and the maximum phase difference can be deduced as:

$$\Delta\lambda_{max} = |\lambda_P - \lambda_0| = \left|\cos^{-1}\left(\frac{\cos\gamma - \sin\phi_P\sin\phi_0}{\cos\phi\cos\phi_0}\right)\right|. \quad (16)$$

Furthermore, a given longitude $\lambda$ can correspond two latitudes, one denoted as $\phi_U(\lambda)$ above the observer and the other denoted as $\phi_L(\lambda)$ below the observer. According to Eq. (13), the two latitudes can be deduced as:

$$\phi_L(\lambda) = \tan^{-1}\left(\frac{\cos\gamma\sin^2\phi_0 - \cos(\lambda-\lambda_0)\cos\phi_0 \cdot A(\lambda-\lambda_0)}{(\cos(\lambda-\lambda_0)\cos\phi_0\cos\gamma + A(\lambda-\lambda_0))\sin\phi_0}\right), \quad (17)$$

$$\phi_U(\lambda) = \begin{cases} B(\lambda), & |\phi_0| < i - \gamma \\ \min\{B(\lambda), i\}, & i - \gamma \le |\phi_0| < i \\ i, & i \le |\phi_0| < \pi - i - \gamma \end{cases}, \quad (18)$$

wherein $$B(\lambda) = \tan^{-1}\left(\frac{\cos\gamma\sin^2\phi_0 + \cos(\lambda-\lambda_0)\cos\phi_0 \cdot A(\lambda-\lambda_0)}{(\cos(\lambda-\lambda_0)\cos\phi_0\cos\gamma - A(\lambda-\lambda_0))\sin\phi_0}\right), \quad (19)$$

$$A(\lambda) = \sin\phi_0\sqrt{\sin^2\gamma - \cos^2\phi_0\sin^2\lambda}. \quad (20)$$

$\phi_U(\lambda)$ in Eq. (18) is related to the latitude $\phi_0$ since all the substellar points within the covered range with respect to the angle of elevation has to be limited within the latitude window $\pm i$ in latitude. After the longitude and latitude windows corresponding to the covered range with respect to the angle of elevation are deduced according to Eqs. (14) to (20), the probability of the substellar point of a given satellite falling with the covered range with respect to the angle of elevation can be represented as:

$$f(\phi, \lambda) = \frac{1}{T_v} \frac{\cos\phi}{\pi\sqrt{\sin^2 i - \sin^2 \phi}}, \quad (21)$$

$T_v$ is a normalized constant, with which an integral value of the function $f(\phi,\lambda)$ within the covered range (a sum of all the possible probabilities) is one, and which can be deduced through the following equation:

$$T_v = \int_{\lambda_0-\Delta\lambda_{max}}^{\lambda_0+\Delta\lambda_{max}} \int_{\phi_L(\lambda)}^{\phi_U(\lambda)} \frac{\cos\phi}{\pi\sqrt{\sin^2 i - \sin^2 \phi}} d\phi d\lambda \quad (22)$$

$$= \int_{\lambda_0-\Delta\lambda_{max}}^{\lambda_0+\Delta\lambda_{max}} \left(\sin^{-1}\left(\frac{\sin\phi_U(\lambda)}{\sin i}\right) - \sin^{-1}\left(\frac{\sin\phi_L(\lambda)}{\sin i}\right)\right) d\lambda$$

Usually, the covered range may be divided into several grids. The probability of the sulbstellar point falling at $(\phi,\lambda)$ is identical to an integral value of the probability density function $f(\phi,\lambda)$ of the grid centered at $(\phi,\lambda)$ i.e.:

$$p(\phi, \lambda) = \int_{\lambda-\frac{\Delta\lambda}{2}}^{\lambda+\frac{\Delta\lambda}{2}} \int_{\phi-\frac{\Delta\phi}{2}}^{\phi+\frac{\Delta\phi}{2}} f(\phi_s, \lambda_s) d\phi_s d\lambda_s, \quad (23)$$

wherein $\Delta\phi$ and $\Delta\lambda$ are the latitude and longitude of the grid, respectively. In the following context the deduced probabilities of all the possible scenarios according to the above process will be demonstrated to see if they are totally compliant with those obtained by the prior orbital simulating method. First, Kepler's orbital elements in a specific instant of all the forty-eight satellites of an ideal Globalstar satellite constellation are generated. Then, the STK software reads these Kepler's orbital elements and simulates the trajectory of each of the satellites in the satellite constellation on the earth ground. During the time when the trajectories are simulated, the substellar point of each of the satellites are recorded one time per five seconds for consecutive seven days, so that the data associated with the substellar points can be accumulated to an amount enough for the calculation by the orbit simulating.

Then, the position of the observation station on the earth ground is set, such as a position with North Latitude 25 degrees and East Longitude 120 degrees. Next, the covered range with respect to the angle of elevation of ten degrees (2925.86 km deduced from Eq. (23) for the Globalstar satellite constellation) are divided, as shown in FIG. 4, into N=2482 grids according to a resolution of $\Delta\phi=\Delta\lambda=1°$. Subsequently, the data of each of the substellar points is quantified as one of the grids the most adjacent to the respective substellar point itself. At last, the number of the substellars falling within each of the grids are calculated and the calculated number is divided by the number of all of the substellar points to obtain the probability of the substellar point of the satellite falling within the grid.

As a result, each of the theoretical probabilities $p(\phi,\lambda)$ of the substellar points falling within $(\phi,\lambda)$ deduced by Eq. (23) of this invention is demonstrated as considerably complaint with $p'(\phi,\lambda)$ as obtained by the conventional STK (Satellite Tool Kit) software, which is available from AGI and can be referred to at http://www.agi.com/.

Figure 6:
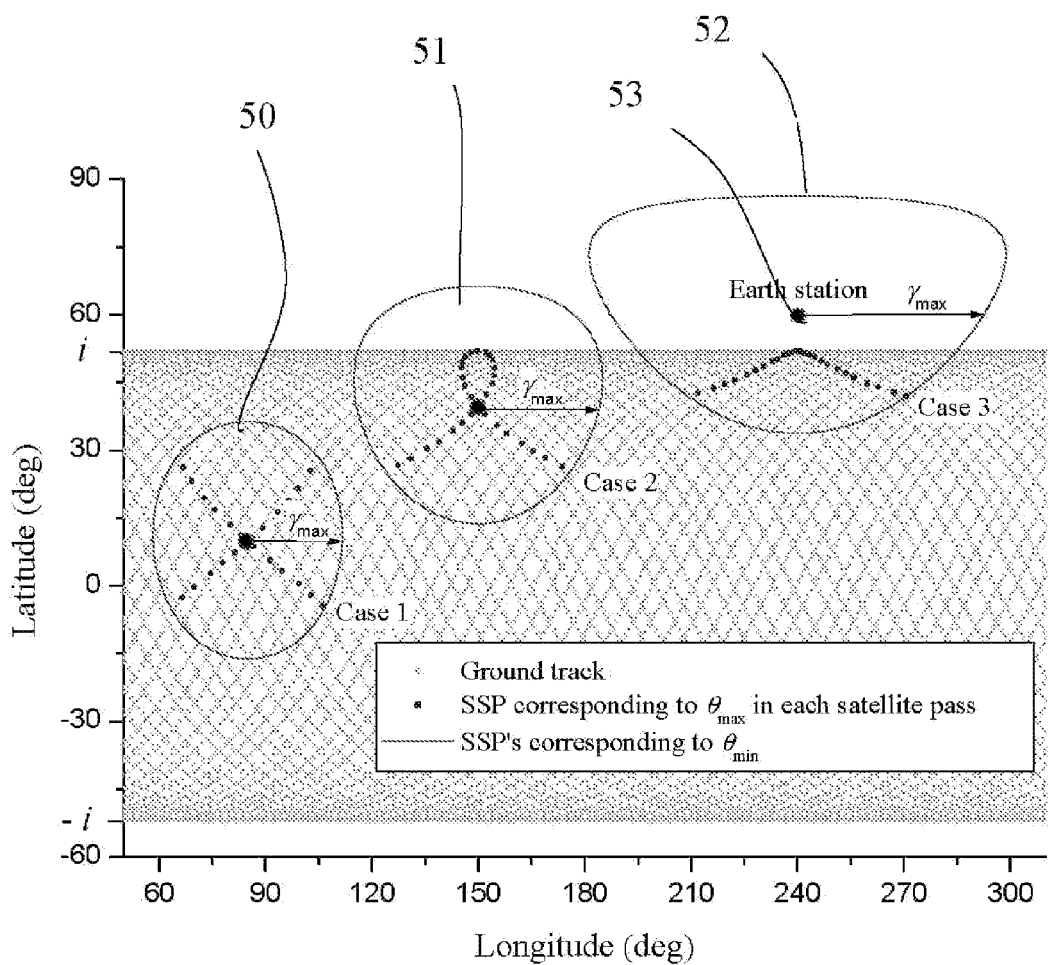
FIG. 6 is a diagram showing projections of Globalstar satellites on the earth ground, i.e. an assembly of constellar points of the satellites, and the covered range with respect to an angle of elevation centered at an observer.

According to the above description, in the case that the substellar point of a given satellite is known to be located at $(\phi,\lambda)$, the positions of the substellar points of the other satellites can be deduced. In other words, the corresponding scenario occurs at a probability of $p(\phi,\lambda)$. The simulated result is shown in FIG. 6. In the figure, the position of the observation station is divided into three parts according to a proportion of the substellar points taking up in the covered range with respect to the angle of elevation. In Case 1 50, it is indicated that the substellar points at a low latitude region are all likely to fall within the covered range with respect to the angle of elevation. In Case 2 51, it is indicated that since a potion of the covered range has a greater latitude than the inclined angle of the orbit at a middle latitude region, the probability of the substellar point falling north than the latitude is zero. Case 3 52 referring to a case where it is still possible to see the satellite with a low angel of elevation although the latitude of the observation station 53 is higher greater than the inclined angle of the orbit, i.e. the maximum angle of elevation 90° does not occur. It is because a portion of the covered range has a latitude lower than the inclined angle of the orbit.

The latitudes 10°, 40° and 60° of the observation station for deduction of the probability of the substellar point of the reference satellite correspond to Case 1, Case 2 and Case 3, respectively. And the probability deduced by Eq. (23) is examined as compliant with that obtained by the conventional STK method. Also, it is demonstrated that the theory and the simulating result are compliant with each other.

By means of the present invention, the deduced mathematical expression for the probability of the scenario of the satellite members in a satellite constellation can be used for any satellite constellation observed at any position of the observation station. As compared to the prior art, although Crowe and Raines have attempted to derive a mathematical formula from the data used in the simulating method, it can solve only the cases with respect to the Globalstar and Iridium satellite constellation, and is limited to the angle of elevation in a single dimension. In addition, it can not be a solution in the case that the observation station on the earth ground is located further north than the South and North Latitude sixty. Instead, the calculating method of the invention can not only be applied to any satellite constellation, but also deduce multi-dimensional probabilities. Further, the inventive calculating method can be applied without any specificity of the number of the satellites, the angle of elevation of each of the satellites and an azimuth, and the latitude of the observation station required.

Since the probability of the scenario may be served as an indicator as to whether the quality of signal reception in satellite communications, the technology disclosed in the present invention may be applied in conjunction with the commercially available satellite simulation software to the design of the receiver of the GPS satellite navigation system, the design of the satellite communications involved mobile phone, and the design and development of a satellite constellation powered by the nation.

The invention claimed is:

1. A calculating method for deducing all possible scenarios and probabilities thereof in a low earth orbiting (LEO) satellite constellation, the calculating method comprising executing the steps of:

(a) setting parameters (P,N) of a to-be-simulated satellite constellation including P orbits each having an orbit plane on which N satellites orbit around;

(b) determining with respect to a position of a given satellite each of the other satellites in the satellite constellation based on the spherical geometry principle, the position of each of the satellites being represented as a substellar point thereof; and (c) calculating a probability when the substellar point of the given satellite $S^{(u,v)}$ is located at a position having the latitude $\phi^{(p,n)}$ and the longitude $\lambda^{(p,n)}$ within a covered range with respect to an angle of elevation as the probability of a respective one of all possible scenarios, wherein $p=1\ldots P$, $n=1\ldots N$.

2. The calculating method as claimed in claim 1, wherein the parameters comprise an orbital plane, a number of satellites orbing on each orbital plane, a separation between orbital planes, an altitude of orbit, an inclined angle of orbit, a phase offset between satellites on adjacent orbital planes and a minimum angle of elevation.

3. The calculating method as claimed in claim 1, wherein the step (b) comprises the steps of:

(b1) deducing a longitude $\alpha_u$ of an ascending node of a u-th orbital plane and a phase $\omega^{(u,v)}$ of a satellite $S^{(u,v)}$ in the u-th orbital plane by assuming a latitude $\phi^{(u,v)}$ and a longitude $\lambda^{(u,v)}$ of a substellar point $S^{(u,v)}$ of a v-th satellite on the u-th orbital plane to be known as an appropriate value;

(b2) determining the ascending node $\alpha_i$, $i=1\ldots P$ of each of the P orbital planes and a phase $\omega^{(p,n)}$, $p=1\ldots P$, $n=1\ldots N$ of each of the N*P satellites according to the longitude $\alpha_u$ of the ascending node of the u-th orbital plane and the phase $\omega^{(u,v)}$ of the satellite $S^{(u,v)}$ orbiting on the u-th orbital plane; and (b3) determining a latitude $\phi^{(p,n)}$ and a longitude $\lambda^{(p,n)}$ of a substellar point $S^{(p,n)}$ of each of the N*P satellites.

4. The calculating method as claimed in claim 1, wherein the step (c) comprises the steps of:

(c1) calculating a covered range with respect to an angle of elevation, the covered range being centered at an observation position $(\phi, \lambda)$ of the observation station, being a small circle having a radius of $\gamma$ dependent on a minimum angle of elevation $\theta_{min}$, and (c2) dividing the covered range into a plurality of grids according a required resolution and calculating a probability of the substellar point locating within one of the grids centered at the observation position $(\phi, \lambda)$ as the probability of the substellar point being located within the observation position $(\phi, \lambda)$.

* * * * *